(12) United States Patent
Reisdorph

(10) Patent No.: US 6,244,143 B1
(45) Date of Patent: Jun. 12, 2001

(54) LATHE

(76) Inventor: Thomas J. Reisdorph, 10272 Rayburn Ct., Spring Hill, FL (US) 34608

( * ) Notice: Subject to any disclaimer, the term of this patent is extended or adjusted under 35 U.S.C. 154(b) by 0 days.

(21) Appl. No.: 09/450,316

(22) Filed: Nov. 29, 1999

(51) Int. Cl.$^7$ .................................................. B23B 5/26
(52) U.S. Cl. ............................. 82/128; 82/132; 82/136
(58) Field of Search ........................... 82/128, 113, 132, 82/136, 154

(56) References Cited

U.S. PATENT DOCUMENTS

| | | | |
|---|---|---|---|
| 4,532,837 | * | 8/1985 | Cushenbery et al. .................. 82/128 |
| 5,056,389 | * | 10/1991 | Johnstead ............................... 82/128 |
| 5,660,093 | * | 8/1997 | Ricci ..................................... 82/113 |
| 6,065,378 | * | 5/2000 | Ricci ..................................... 82/128 |

* cited by examiner

*Primary Examiner*—Henry Tsai

(57) ABSTRACT

A lathe adapted to trim and true the circumference of a rotating cylindrical surface comprising an axially forward plate with a central aperture and a plurality of radially interior and radially exterior apertures, an axial rearward plate with a plurality of radially interior and radially exterior apertures; fixed cylindrical spacers fixedly coupling the forward and the rearward plates, a plurality of threaded cylindrical spindles rotatably supported with respect to the forward and rearward plates with a planetary gear secured with respect to each spindle, a rotatable advancement assembly formed with a rotatable plate and a forwardly facing cylindrical periphery and a tracking ring in meshing contact with the planetary gears whereby rotation of the rotatable plate with respect to the rearward plate will rotate the tracking ring to rotate the planetary gears and the threaded cylindrical spindles, a carriage having two parallel threaded bores in meshing relationship with the threads of spindles for axial movement of the carriage in response to the rotation of the rotatable plate, a cutting tool adjustably coupled to the carriage at an angle with an operator controlled screw to effect linear axial movement of the cutting tool.

3 Claims, 4 Drawing Sheets

LATHE

BACKGROUND OF THE INVENTION

1. Field of the Invention

The present invention relates to a new and improved lathe and, more particularly, pertains to trimming and truing slip rings of alternators with a miniaturized portable lathe.

2. Description of the Prior Art

As will become evident from the descriptions herein after, on certain Leece-Nevelle alternators that use external slip rings, excessive slip ring run-out causes premature voltage regulator and/or brush failure and bearing failure due to the heat generated by brush bounce. By reducing or eliminating excessive slip ring run-out, the life of an alternator will be greatly extended.

During there building process the slip ring end frame bearing must be removed from the rotor and replaced. To accomplish this step the slip ring must be unsoldered from the rotor coil leads and removed with a puller. The slip ring end frame bearing is removed and the new bearing then installed on the rotor shaft. At this point either the original slip ring is reinstalled on the rotor or a new slip ring is installed and soldered into place. Most certainly for the reinstallation and certainly for the installation of the new slip ring a truing of the slip ring is necessary once it has been pressed on the rotor shaft. This can be accomplished by placing the rotor in the lathe and using a live center or a steady-rest to true the slip ring. Using the live center on the slip ring end of the rotor shaft assumes that the tail shaft of the rotor is true, which is often not the case. Once turned, the slip ring will be out of round. Use of the steady-rest to secure the slip ring end bearing while turning the rotor will provide better results, but is difficult and time consuming to set up.

By using the lathe of the present invention, the truing of the slip ring can be accomplished after the alternator has been assembled minus the brush holder and/or brush holder and voltage regulator. With this process the miniature lathe is attached to the slip ring end frame by means of clamps, and is automatically centered. The cutting tool of the miniature lathe is adjusted to the proper cutting depth and the entire assembly placed on an alternator test bench. The alternator and miniature lathe is then fixed to the test bench and the alternator is hooked up to the drive belt. The alternator is then spun in a counterclockwise rotation. The manual drive of the miniature lathe is engaged and the slip ring is then cut. Depending upon the amount of run-out of the slip ring, the miniature lathe will probably need to be readjusted and engaged again until the entire surface of the slip ring has been cut and trued. By cutting and truing the slip ring after the alternator has been assembled, the rebuilder gets the advantage of having both the drive end frame and the slip ring end bearings in place to accurately center the rotor and the slip ring for the cutting process. In addition the use of the miniature lathe will shorten the rebuild time.

In summary, the use of this invention will greatly refine rebuilding of those Leece-Neville alternators having external slip ring placement The finished product will be a more accurate representation of the rebuilders craft.

The use of lathes is known in the prior art. More specifically, lathes heretofore devised and utilized for the purpose of trimming and truing rotating cylinders are known to consist basically of familiar, expected, and obvious structural configurations, notwithstanding the myriad of designs encompassed by the crowded prior art which has been developed for the fulfillment of countless objectives and requirements.

The prior art discloses a large number of lathes. By way of example, U.S. Pat. No. 4,328,722 to Wohlhaupter discloses apparatus for facing and internal turning. U.S. Pat. No. 4,355,533 to Church discloses a portable turning tool. U.S. Pat. No. 4,506,570 to Wood discloses a lathe apparatus especially designed for brake drums and discs. Lastly, U.S. Pat. No. 5,009,728 to Thiem discloses a swing arm brake lathe.

In this respect, the lathe according to the present invention substantially departs from the conventional concepts and designs of the prior art, and in doing so provides an apparatus primarily developed for the purpose of trimming and truing slip rings of alternators.

Therefore, it can be appreciated that there exists a continuing need for a new and improved lathe which can be used for trimming and truing slip rings of alternators. In this regard, the present invention substantially fulfills this need.

SUMMARY OF THE INVENTION

In view of the foregoing disadvantages inherent in the known types of lathes now present in the prior art, the present invention provides a new and improved lathe. As such, the general purpose of the present invention, which will be described subsequently in greater detail, is to provide a new and improved lathe and methods which have all the advantages of the prior art and none of the disadvantages.

To attain this, the present invention essentially comprises a new and improved portable miniature lathe system adapted to cut external the slip ring of a Leece-Neville type alternator in order to trim and true its circumference, the system comprising, in combination, an alternator of the Leece-Nevelle type having a housing with an arcuate peripheral edge and a cylindrical external slip ring extending therefrom adapted to be rotated about its axis for being cut after the brushes have been removed from the slip ring; an axially forward plate in a circular configuration with a central aperture there through and a peripheral edge and with three radially interior apertures located equally spaced at 120 degrees there around and three radial exterior apertures located equally spaced at 120 degrees there around; an axial rearward plate in a circular configuration spaced in parallel relation with the forward plate, the rearward plate having three radially interior apertures located equally spaced at 120 degrees there around and three radially exterior apertures located equally space 120 degrees there around, the plates having a common axis coextensive with the axis of the slip ring and with the interior apertures of the plates being in axial alignment and the exterior apertures of the plates being in axial alignment, the rearward plate also having a peripheral edge; three fixed cylindrical spacers with first ends and second ends, each end having a threaded recess with threaded fasteners fixedly coupling the first ends to the exterior apertures of the forward plate and fixedly coupling the second ends to the exterior apertures of the rearward plate to maintain the plates at a fixed distance with respect to each other and in parallel alignment; three threaded cylindrical spindles with first ends rotatably supported in the internal apertures of the forward plate and with second ends rotatably supported adjacent to the interior apertures of the rearward plate, each spindle having an outboard end on the side of the rearward plate remote from the forward plate with a planetary gear having teeth secured by splines with respect to each outboard end; a rotatable advancement assembly formed of the rearward plate forwardly and a spaced rotatable plate rearwardly thereof and parallel therewith, the rotatable plate including a forwardly facing cylindrical periphery formed with a tracking ring having radial interiorly facing teeth in meshing contact with the teeth of the planetary gears whereby rotation of the rotatable plate with respect to the rearward plate will rotate the tracking ring to rotate the planetary gears and the threaded spindles, the exterior face of the rotatable plate having an annular groove with an elastomeric ring therein to facilitate gripping; a carriage having two parallel threaded bores in meshing relationship with the threads of two of the threaded spindles for axial movement of the carriage between the outer plate and the inner plate in response to the rotation of the rotatable plate, the carriage having a hollow support tube coupled thereto between the bores with an axis at about 45 degrees with respect to the bores; a cutting tool adjustably coupled to the support tube of the carriage at an angle of about 45 degrees from the axis of the slip ring, the cutting tool having an operator controlled screw in association therewith to be rotated and thereby effect linear axial movement of the cutting tool with respect the tube and carriage for movement toward and away from an axis of a rotating slip ring, the cutting tool being in axial alignment with an enlargement of the central aperture of the forward plate to allow the cutting tool to contact and cut the slip ring on the side of the inner plate remote from the outer plate; an elastomeric washer secured to the forward face of the forward plate in contact with the housing of the alternator to abate vibrations; and a pair of arcuate clamps each with a U-shaped configuration formed with parallel faces and a base therebetween, one face of each clamp having two spaced threaded apertures with wing nuts received there within, the clamps and wing nuts contacting and securing together the periphery of the forward plate and the periphery of the alternator housing with the slip ring extending through the central aperture of the forward plate whereby energization and rotation of the slip ring of the alternator with the cutting tool in contact therewith will effect trimming of the slip ring along its length as the rotatable plate rotates the tracking ring to move the carriage along the length of the axis of the slip ring.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lathe which has all the advantages of the prior art lathes and none of the disadvantages.

It is another object of the present invention to provide a new and improved lathe which may be easily and efficiently manufacture, marketed and utilized.

It is a further object of the present invention to provide a new and improved lathe which is of a durable and reliable construction.

An even further object of the present invention is to provide a new and improved lathe which is susceptible of a low cost of manufacture with regard to both materials and labor, and which accordingly is then susceptible of low prices of sale to the industry, thereby making such the lathe of the present invention economically available.

Even still another object of the present invention is to trim and true rotating cylindrical members.

Lastly, it is an object of the present invention to provide a lathe adapted to trim and true the circumference of a rotating cylindrical surface comprising an axially forward plate with a central aperture and a plurality of radially interior and radial exterior apertures; an axial rearward plate with a plurality of radially interior and radially exterior apertures; fixed cylindrical spacers fixedly coupling the forward and the rearward plates; threaded cylindrical spindle rotatably supported with respect to the forward and rearward plate with a planetary gear secured with respect to each spindle; a rotatable advancement assembly formed with a rotatable plate and a forwardly facing cylindrical periphery and a tracking ring in meshing contact with the planetary gears whereby rotation of the rotatable plate with respect to the rearward plate will rotate the tracking ring to rotate the planetary gears and the threaded spindles; a carriage having two parallel threaded bores in meshing relationship with the threads of spindles for axial movement of the carriage in response to the rotation of the rotatable plate; a cutting tool adjustably coupled to the carriage at an angle with an operator controlled screw to effect linear axial movement of the cutting tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

As used in the various Figures herein, the same reference numerals refer to the same parts throughout the various Figures.

DESCRIPTION OF THE PREFERRED EMBODIMENT

Figure 1:
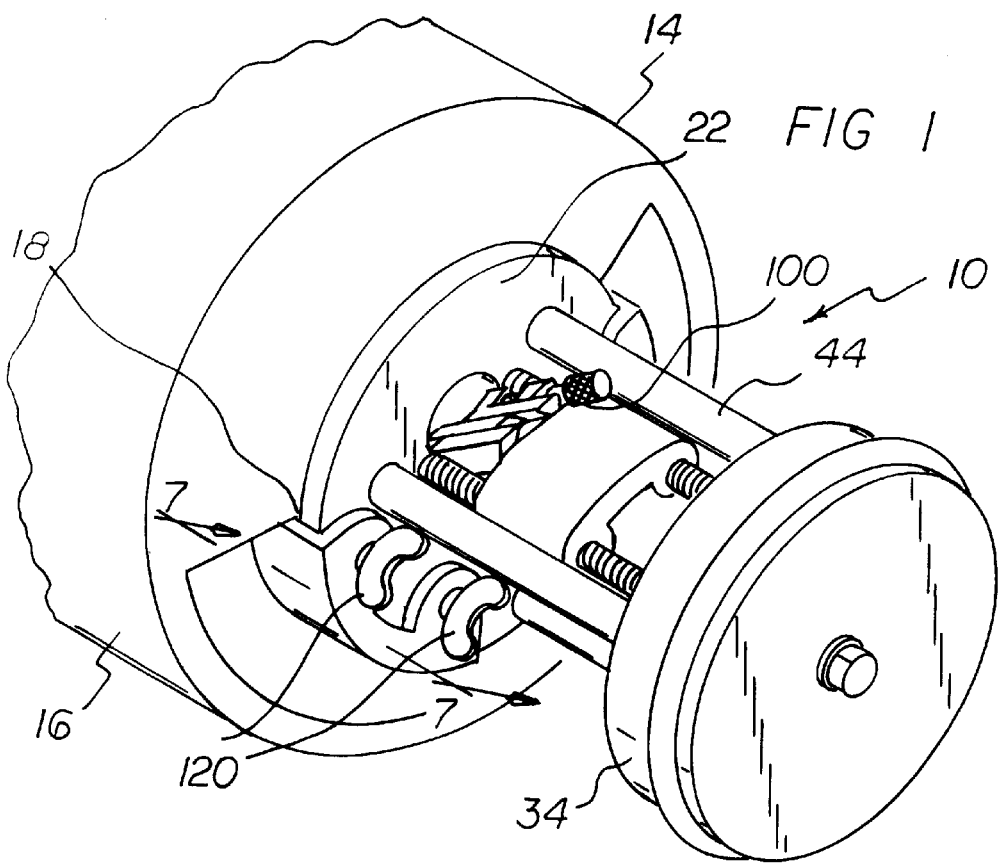
FIG. 1 is a perspective illustration of the preferred embodiment of the miniaturized and portable lathe constructed in accordance with the principles of the primary embodiment of the present invention.
Figure 2:
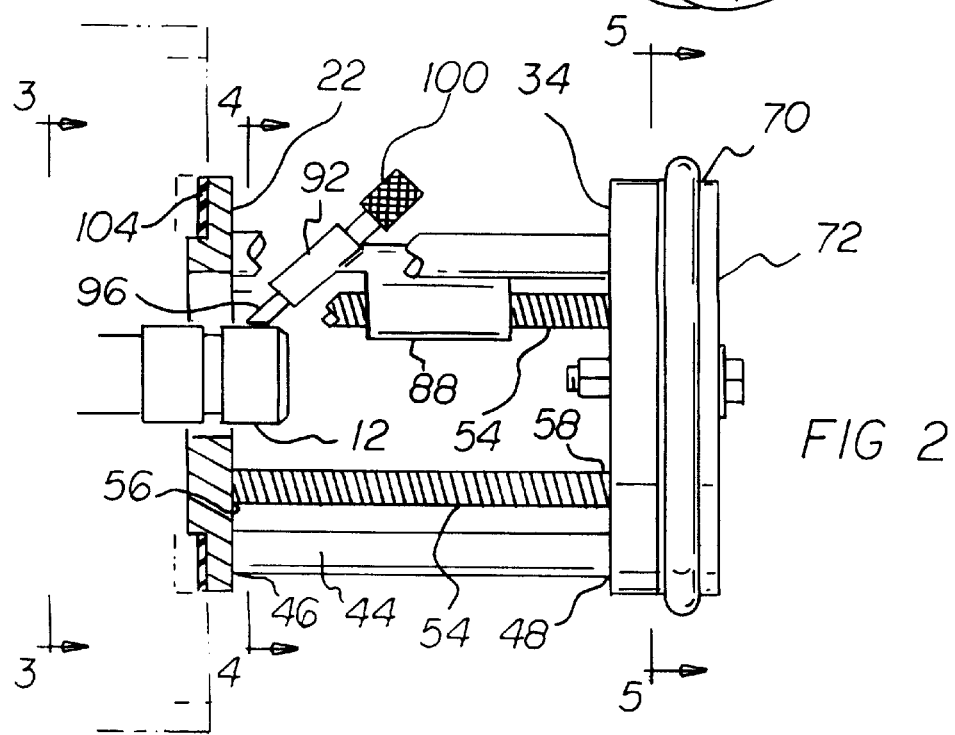
FIG. 2 is a side elevational view of the miniaturized and portable lathe shown in FIG. 1 with various parts shown in cross sectional configuration.
Figure 3:
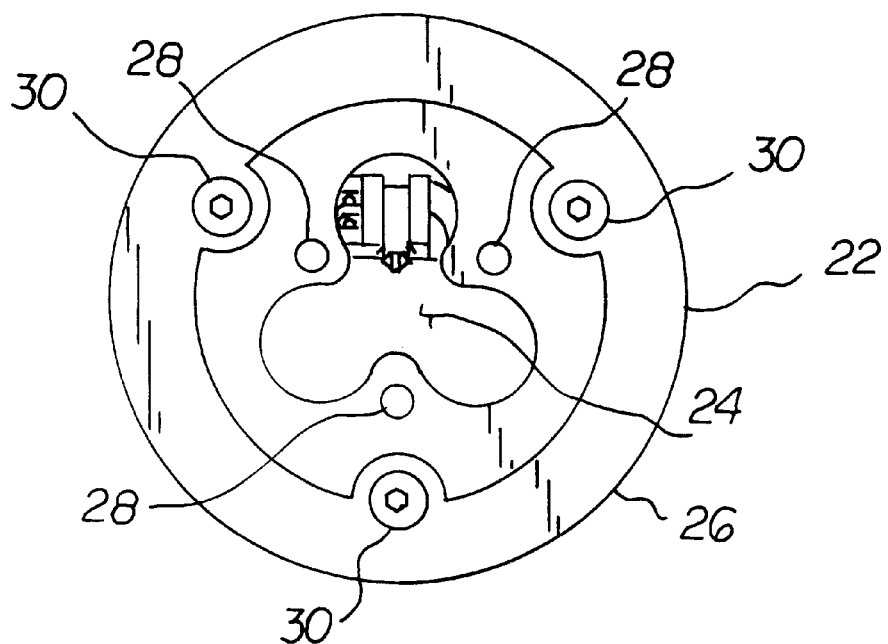
FIG. 3 is an end view taken along line 3—3 of FIG. 2.
Figure 4:
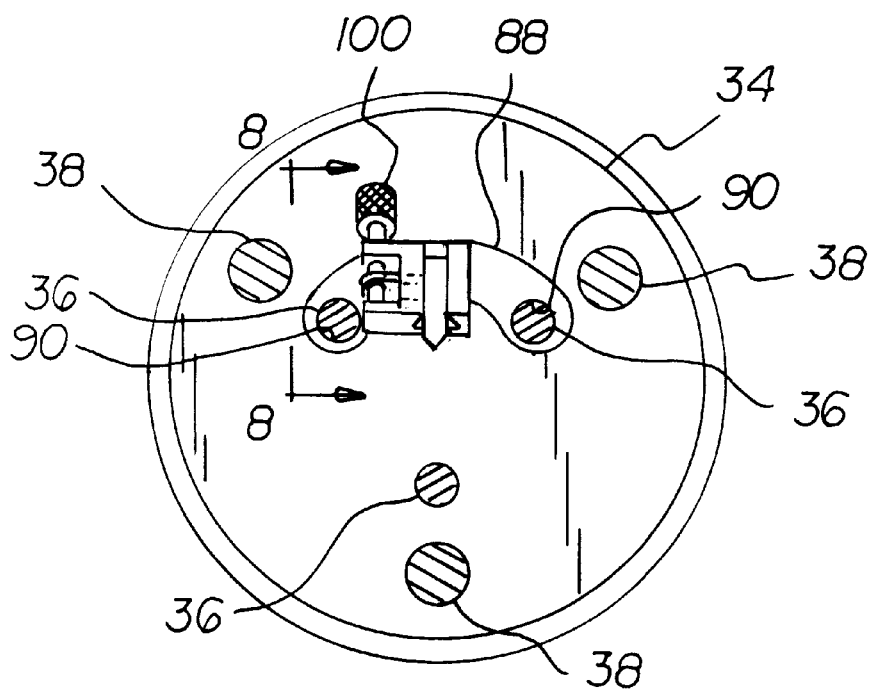
FIG. 4 is a cross sectional view taken along line 4—4 of FIG. 2.
Figure 5:
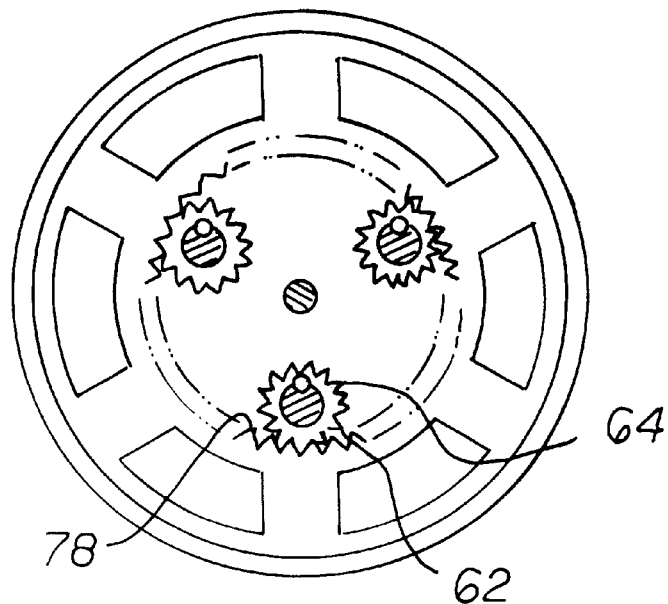
FIG. 5 is a cross sectional view taken along line 5—5 of FIG. 2.
Figure 6:
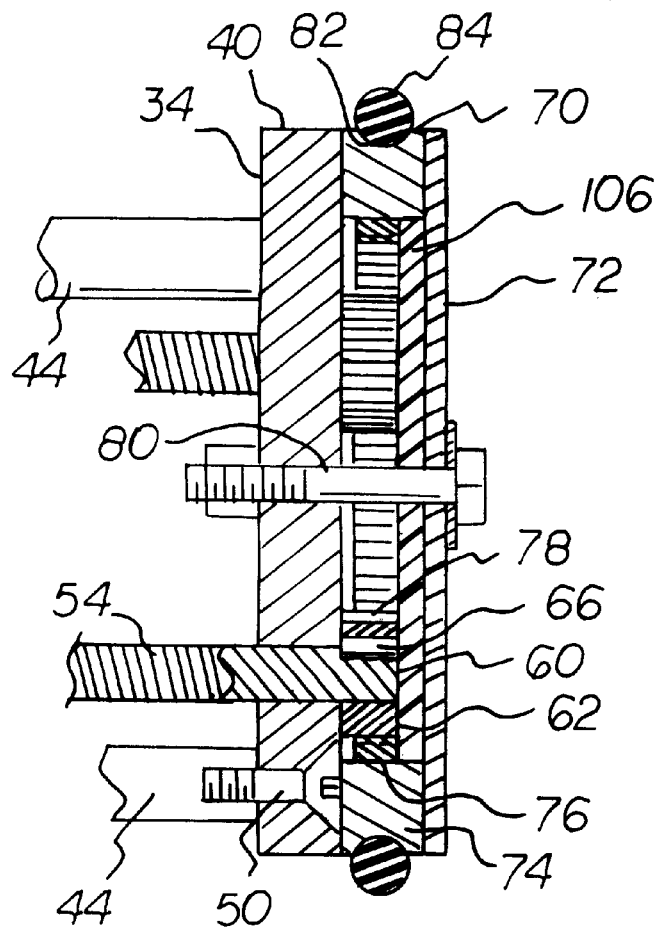
FIG. 6 is a cross sectional view taken along line 6—6 of FIG. 2.
Figure 7:
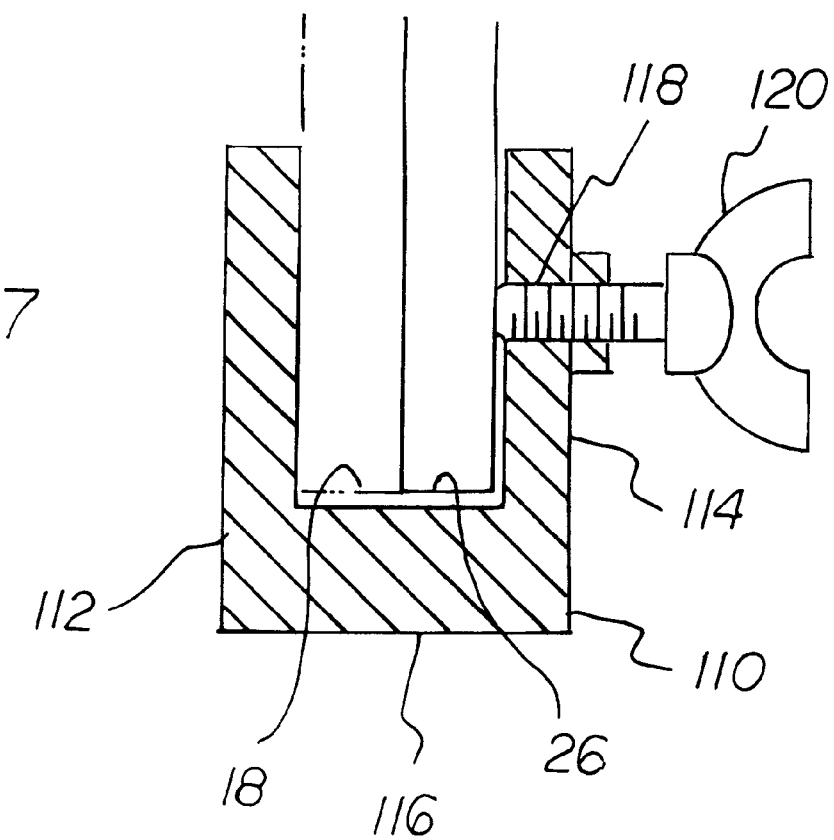
FIG. 7 is a cross sectional view taken along line 7—7 of FIG. 2.
Figure 8:
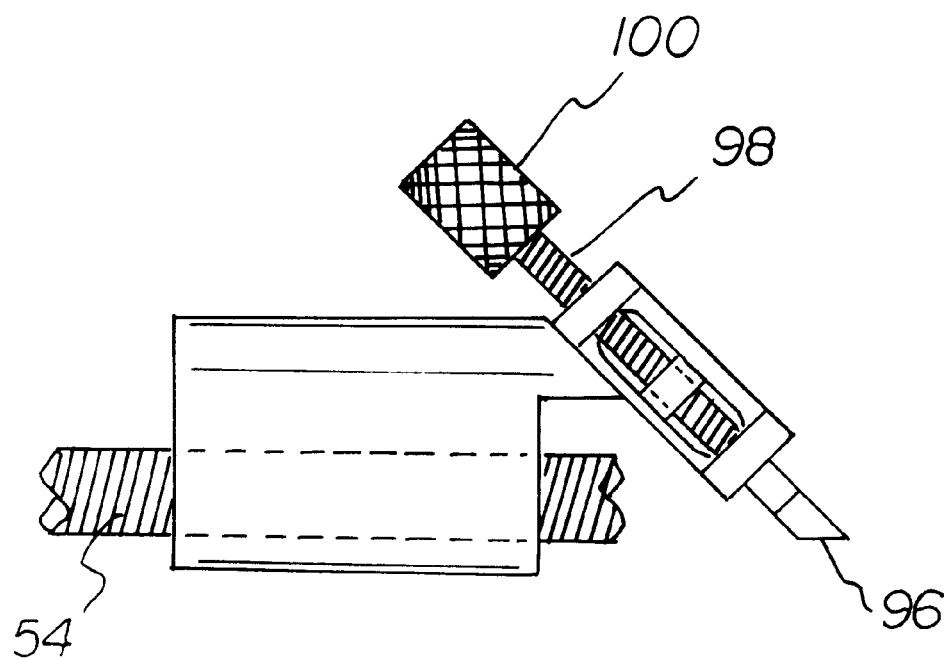
FIG. 8 is a cross sectional view taken along line 8—8 of FIG. 4.

With reference now to the drawings, and in particular to FIGS. 1 through 8 thereof, the preferred embodiment of the new and improved lathe embodying the principles and concepts of the present invention and generally designated by the reference numeral 10 will be described.

The present invention, the new and improved lathe is a system 10 comprised of a plurality of components. Such components, in their broadest context, include a forward and rearward plate, spacers, spindles, an advancement assembly, a carriage and a cutting tool. Each of the individual components is specifically configured and correlated one with respect to the other so as to attain the desired objectives.

More specifically, the system of the present invention is a portable miniature lathe system 10. It is adapted to cut, preferably, the external the slip ring 12 of a Leece-Neville type alternator 14. This is in order to trim and true its circumference. The system includes an alternator of the Leece-Nevelle type. Such alternator has a housing 16 with an arcuate peripheral edge 18. It also has a cylindrical external slip ring 12 extending therefrom. The slip ring is adapted to be rotated about its axis for being cut after the brushes have been removed from the slip ring.

Also included is an axially forward plate 22 in a circular configuration. Such plate is formed with a central aperture 24 there through and also includes a peripheral edge 26. Also formed in such plate are three radially interior apertures 28 which are located equally spaced at 120 degrees there around. Also formed in such plate are three radial exterior apertures 30 located equally spaced at 120 degrees there around., An axial rearward plate 34 is next provided. Such plate is in a circular configuration spaced in parallel relation with the forward plate. The rearward plate has three radially interior apertures 36 located equally spaced at 120 degrees there around as well as three radially exterior apertures 38 also located equally space 120 degrees there around. The plates having a common axis coextensive with the axis of the slip ring. The interior apertures of the plates are in axial alignment and the exterior apertures of the plates are also in axial alignment. The rearward plate also having a peripheral edge 40.

Coupling between the plates is through three fixed cylindrical spacers 44. Each spacer is formed with first ends 46 and second ends 48. Each end has a threaded recess with threaded fasteners 50 fixedly coupling the first ends to the exterior apertures of the forward plate and, in addition, fixedly coupling the second ends to the exterior apertures of the rearward plate. This is to maintain the plates at a fixed distance with respect to each other and in parallel alignment.

Parallel with the spacers are three threaded cylindrical spindles 54. Each spindle is formed with first ends 56 rotatably supported in the internal apertures of the forward plate and with second ends 58 rotatably supported adjacent to the interior apertures of the rearward plate. Each spindle has an outboard end 60 on the side of the rearward plate remote from the forward plate. In addition, a planetary gear 62 with teeth 64 is secured by splines 66 with respect to each outboard end.

Next provided is a rotatable advancement assembly 70. Such assembly includes the rearward plate 34 forwardly and a spaced rotatable plate 72 rearwardly thereof and parallel therewith. The rotatable plate further includes a forwardly facing cylindrical disk 74 with a periphery formed with a tracking ring 76, preferably formed of a rigid plastic such as nylon. The disk 74 is coupled to the rotatable plate for rotation therewith. The tracking ring has radial interiorly facing teeth 78 in meshing contact with the teeth of the planetary gear. A bolt 80 through apertures at the axes of the rotatable plate couples such plates and allows mutual rotation therebetween. In this manner, rotation of the rotatable plate with respect to the rearward plate will rotate the tracking ring to rotate the planetary gears and the threaded spindles. The exterior face of the rotatable plate is further formed with an annular groove 82 which has therein an elastomeric ring 84 so as to facilitate gripping.

Operatively associated with the spindles is a carriage 88. The carriage has two parallel threaded bores 90 in meshing relationship with the threads of two of the threaded spindles. This relationship is to effect axial movement of the carriage between the outer plate and the inner plate in response to the rotation of the rotatable plate. The carriage has a hollow support tube 92 coupled thereto between the bores with an axis at about 45 degrees with respect to the bores.

A replaceable cutting tool 96 is adjustably coupled to the support tube of the carriage at an angle of about 45 degrees from the axis of the slip ring. The cutting tool has an operator controlled screw 98 with a knurled griping end 100 in association therewith. Such screw is adapted to be rotated and thereby effect linear axial movement of the cutting tool with respect the tube and carriage for movement toward and away from an axis of a rotating slip ring. This is for adjustment and fine tuning of the cut on the rotating cylindrical member. The cutting tool is in axial alignment with an enlargement of the central aperture of the forward plate. This allows the cutting tool to contact and cut the slip ring on the side of the inner plate remote from the outer plate.

An elastomeric washer 104 is next secured to the forward face of the forward plate in contact with the housing of the alternator to abate vibrations. Additionally, an elastomeric washer 106, preferably of nylon, is on the forward face of the rotatable plate to constitute a surface for spacer and bushing purposes.

Lastly provided is a pair of arcuate clamps 110. Each clamp is in a U-shaped configuration and formed with parallel faces 112, 114 and a base 116 therebetween. One face of each clamp has two spaced threaded apertures 118. Wing nuts 120 are receive within such threaded apertures. The clamps and wing nuts contact and releasably secure together the periphery of the forward plate and the periphery of the alternator housing with the slip ring extending through the central aperture of the forward plate. In this manner, energization and rotation of the slip ring of the alternator with the cutting tool in contact therewith will effect trimming of the slip ring along its length as the rotatable plate rotates the tracking ring to move the carriage along the length of the axis of the slip ring.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable miniature lathe system adapted to cut an external slip ring of a Leece-Neville type alternator in order to trim and true its circumference comprising, in combination:

an alternator of the Leece-Nevelle type having a housing with an arcuate peripheral edge and a cylindrical external slip ring extending therefrom adapted to be rotated about its axis for being cut after the brushes have been removed from the slip ring; an axially forward plate in a circular configuration with a central aperture there through and a peripheral edge and with three radially interior apertures located equally spaced at 120 degrees there around and three radial exterior apertures located equally spaced at 120 degrees there around;

an axial rearward plate in a circular configuration spaced in parallel relation with the forward plate, the rearward plate having three radially interior apertures located equally spaced at 120 degrees there around and three radially exterior apertures located equally space 120 degrees there around, the plates having a common axis coextensive with the axis of the slip ring and with the interior apertures of the plates being in axial alignment and the exterior apertures of the plates being in axial alignment, the rearward plate also having a peripheral edge;

three fixed cylindrical spacers with first ends and second ends, each end having a threaded recess with threaded fasteners fixedly coupling the first ends to the exterior apertures of the forward plate and fixedly coupling the second ends to the exterior apertures of the rearward plate to maintain the plates at a fixed distance with respect to each other and in parallel alignment;

three threaded cylindrical spindles with first ends rotatably supported in the internal apertures of the forward plate and with second ends rotatably supported adjacent to the interior apertures of the rearward plate, each spindle having an outboard end on the side of the rearward plate remote from the forward plate with a planetary gear having teeth secured by splines with respect to each outboard end;

a rotatable advancement assembly formed of the rearward plate forwardly and a spaced rotatable plate rearwardly thereof and parallel therewith, the rotatable plate including a forwardly facing cylindrical periphery formed with a tracking ring having radial interiorly facing teeth in meshing contact with the teeth of the planetary gears whereby rotation of the rotatable plate with respect to the rearward plate will rotate the tracking ring to rotate the planetary gears and the threaded spindles, the exterior face of the rotatable plate having an annular groove with an elastomeric ring therein to facilitate gripping;

a carriage having two parallel threaded bores in meshing relationship with the threads of two of the threaded spindles for axial movement of the carriage between the forward plate and the rearward plate in response to the rotation of the rotatable plate, the carriage having a hollow support tube coupled thereto between the bores with an axis at about 45 degrees with respect to the bores;

a cutting tool adjustably coupled to the support tube of the carriage at an angle of about 45 degrees from the axis of the slip ring, the cutting tool having an operator controlled screw in association therewith to be rotated and thereby effect linear axial movement of the cutting tool with respect the tube and carriage for movement toward and away from an axis of a rotating slip ring, the cutting tool being in axial alignment with an enlargement of the central aperture of the forward plate to allow the cutting tool to contact and cut the slip ring on the side of the inner plate remote from the outer plate;

an elastomeric washer secured to the forward face of the forward plate in contact with the housing of the alternator to abate vibrations; and a pair of arcuate clamps each with a U-shaped configuration formed with parallel faces and a base therebetween, one face of each clamp having two spaced threaded apertures with wing nuts received there within, the clamps and wing nuts contacting and securing together the periphery of the forward plate and the periphery of the alternator housing with the slip ring extending through the central aperture of the forward plate whereby energization and rotation of the slip ring of the alternator with the cutting tool in contact therewith will effect trimming of the slip ring along its length as the rotatable plate rotates the tracking ring to move the carriage along the length of the axis of the slip ring.

2. A lathe adapted to trim and true the circumference of a rotating cylindrical surface comprising:

an axially forward plate with a central aperture and a plurality of radially interior and radially exterior apertures;

an axial rearward plate with a plurality of radially interior and radially exterior apertures;

fixed cylindrical spacers fixedly coupling the forward and the rearward plates;

a plurality of threaded cylindrical spindles rotatably supported with respect to the forward and rearward plates with a planetary gear secured with respect to each spindle;

a rotatable advancement assembly formed with a rotatable plate and a forwardly facing cylindrical periphery and a tracking ring in meshing contact with the planetary gears whereby rotation of the rotatable plate with respect to the rearward plate will rotate the tracking ring to rotate the planetary gears and the threaded cylindrical spindles;

a carriage having two parallel threaded bores in meshing relationship with the threads of spindles for axial movement of the carriage in response to the rotation of the rotatable plate; a cutting tool adjustably coupled to the carriage at an angle with an operator controlled screw to effect linear axial movement of the cutting tool; and a pair of arcuate clamps each with a U-shaped configuration formed with parallel faces and a base therebetween, one face of each clamp having two spaced threaded apertures with wing nuts received there within, the clamps and wing nuts contacting and securing together the periphery of the forward plate and the periphery of an alternator housing with the slip ring extending through a central aperture of the forward plate whereby energization and rotation of the slip ring of the alternator with the cutting tool in contact therewith will effect trimming and truing of the slip ring along its length as the rotatable plate rotates the tracking ring to move the carriage along the length of the axis of the slip ring.

3. A lathe adapted to trim and true the circumference of a rotating cylindrical surface comprising:

an axially forward plate with a central aperture and a plurality of radially interior and radially exterior apertures;

an axial rearward plate with a plurality of radially interior and radially exterior apertures;

fixed cylindrical spacers fixedly coupling the forward and the rearward plates;

a plurality of threaded cylindrical spindles rotatably supported with respect to the forward and rearward plates with a planetary gear secured with respect to each spindle;

a rotatable advancement assembly formed with a rotatable plate and a forwardly facing cylindrical periphery and a tracking ring in meshing contact with the planetary gears whereby rotation of the rotatable plate with respect to the rearward plate will rotate the tracking ring to rotate the planetary gears and the threaded cylindrical spindles;

a carriage having two parallel threaded bores in meshing relationship with the threads of spindles for axial movement of the carriage in response to the rotation of the rotatable plate;

a cutting tool adjustably coupled to the carriage at an angle with an operator controlled screw to effect linear axial movement of the cutting tool; and a slip ring having removable brushes of an alternator of the Leece-Nevelle type having a housing with an arcuate peripheral edge and the slip ring extending therefrom and being adapted to be rotated for being cut after the brushes have been removed from the slip ring.

\* \* \* \* \*